March 21, 1961 — A. P. DAHLMAN — 2,976,082
ROLL-UP VEHICLE LOAD COVER
Filed Sept. 12, 1958 — 2 Sheets-Sheet 1
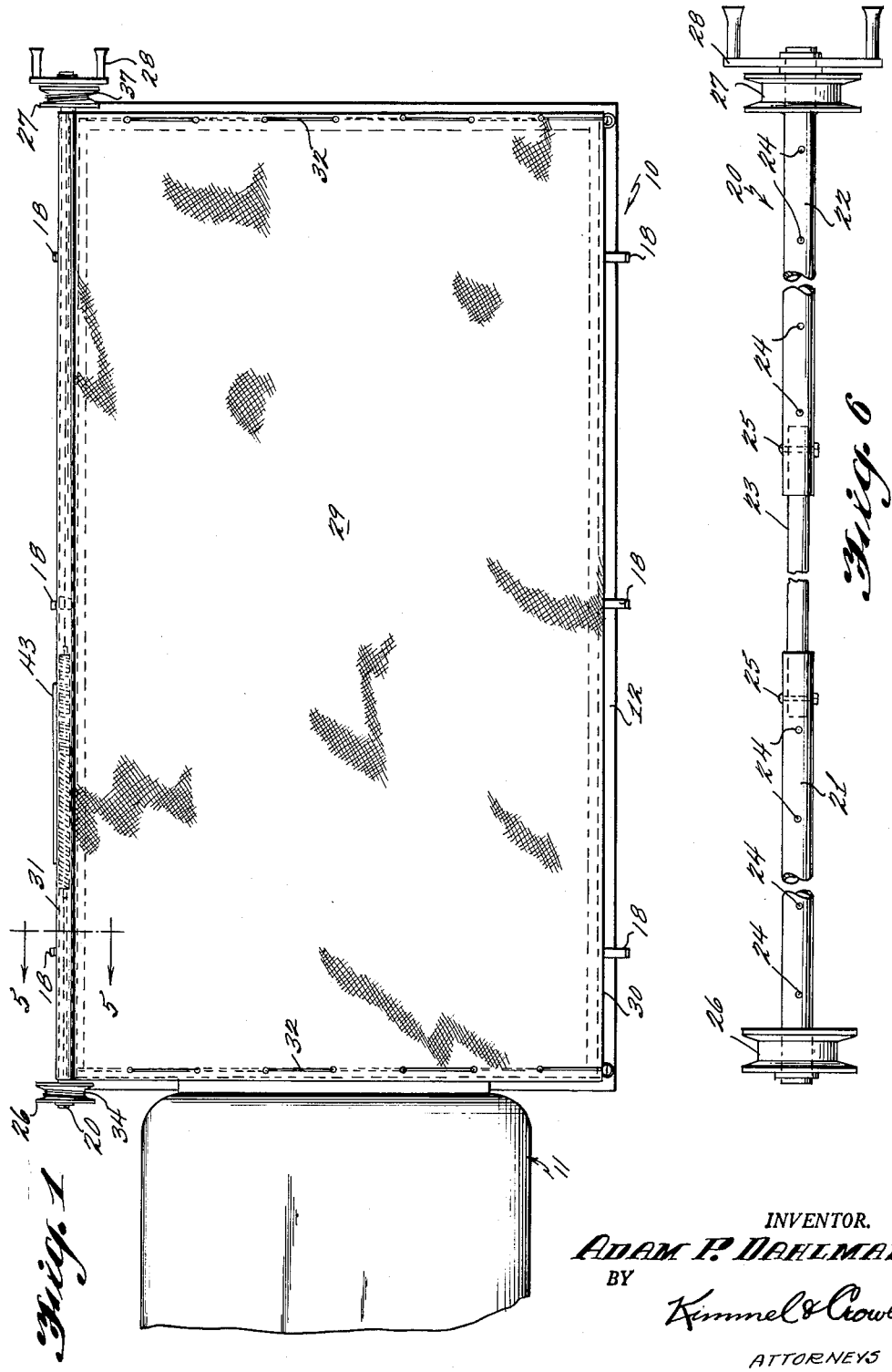
INVENTOR.
Adam P. Dahlman
BY
Kimmel & Crowell
ATTORNEYS

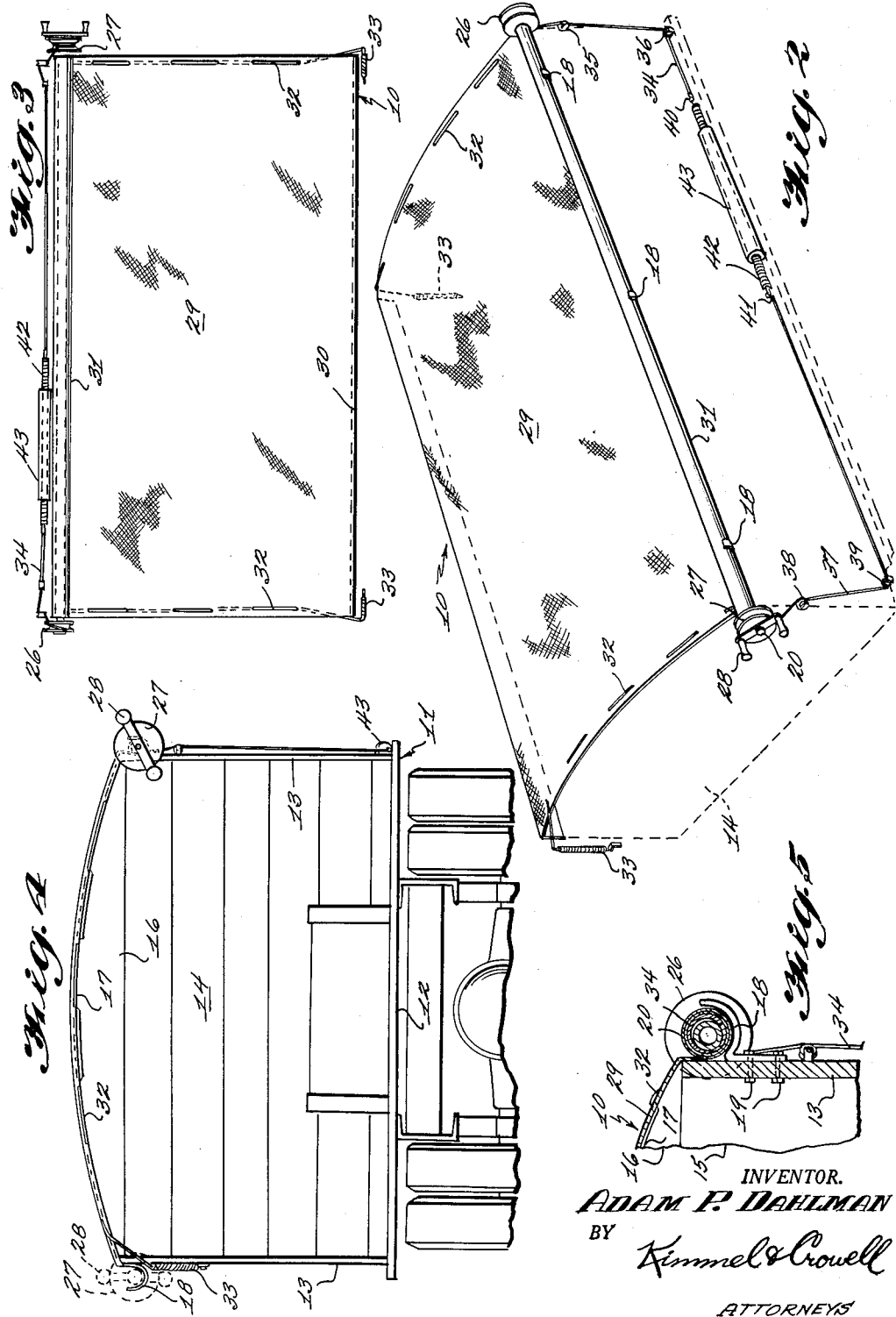

United States Patent Office 2,976,082
Patented Mar. 21, 1961

2,976,082
ROLL-UP VEHICLE LOAD COVER
Adam P. Dahlman, Box 143, Power, Mont.
Filed Sept. 12, 1958, Ser. No. 760,663
2 Claims. (Cl. 296—98)

The present invention relates to tarpaulin attachments for truck bodies or other storage and enclosure areas, and particularly to such attachments which can be carried in covered and uncovered relation to said areas.

The primary object of the invention is to provide a tarpaulin attachment having means for rolling the tarpaulin from a covered position to an uncovered position and for securing the tarpaulin in covering position and in rolled stored position at the option of the user.

Another object of the invention is to provide for open truck bodies a tarpaulin attachment having resilient means for assisting in the movement of the tarpaulin from its covering position to its stored position, and vice versa.

A further object of the invention is to provide a tarpaulin attachment for truck bodies, or other storage areas, in which hand operated means are provided for rolling the tarpaulin in both directions of movement.

A still further object of the invention is to provide a tarpaulin attachment of the class described above which is inexpensive to manufacture, simple to attach and use and which can be easily adapted to trucks and other storage areas of differing design.

Other objects and advantages will become apparent in the following specification when considered in the light of the attached drawings, in which:

Figure 1 is a top plan view of the invention with the tarpaulin illustrated in a truck covering position;

Figure 2 is a perspective view of the invention with the tarpaulin illustrated in a truck covering position;

Figure 3 is a view similar to Figure 1 of the tarpaulin and related parts;

Figure 4 is a rear elevation of a truck showing the tarpaulin in full lines in covering position and in broken lines in stored position;

Figure 5 is an enlarged fragmentary vertical section of the tarpaulin roll supported in a truck covering position; and Figure 6 is an enlarged fragmentary plan view of the tarpaulin spindle with the tarpaulin removed therefrom.

Referring now to the drawings in detail wherein like reference characters indicate like parts throughout the several figures, reference numeral 10 indicates generally a tarpaulin attachment for use with a truck, generally indicated at 11.

The truck 11 has a hopper body 12 which includes a pair of spaced apart parallel side walls 13, a rear wall 14, and a front wall 15. The hopper body 12 is of conventional construction and the side walls 13, rear wall 14 and front wall 15 are secured together in a conventional manner. The front and rear walls 14, 15 are each provided with a top board 16 having a convex upper edge 17 to support the tarpaulin attachment 10.

The side walls 13 are each provided with a plurality of arcuate brackets 18 arranged in horizontally spaced aligned relation and secured to the side walls 13 by bolts 19.

The tarpaulin attachment 10 includes an elongated spindle, generally indicated at 20, having a pair of spaced apart tubular end sections 21, 22 telescoped over the opposite ends of a central connector 23. The tubular sections 21, 22 are each provided with a plurality of transversely extending bores 24 arranged in spaced apart relation therealong and the connector 23 is secured to the spaced apart sections 21, 22 in a selected pair of the bores 24 by means of bolts 25. With this arrangement the spindle 20 may be readily longitudinally adjusted to fit trucks of varying body sizes. The section 21 has a spool 26 rigidly secured to the end thereof opposite the connector 23 and the section 22 has a spool 27 rigidly secured to the end thereof opposite the connector 23. A hand crank 28 is also rigidly secured to the end of the section 22 opposite the connector 23, adjacent the spool 27, to provide means for turning the spindle 20.

A fabric tarpaulin panel 29 has a side edge 30 thereof secured to the upper edge of one of the side walls 13 above the arcuate brackets 18 and the opposite side edge 31 secured to the spindle 20. The tarpaulin panel 29 extends from the front wall 15 to the rear wall 14 and is supported on the convex upper edge 17 of the boards 16.

The panel 29 has a flexible cable 32 stitched transversely thereof adjacent the front and rear edges of the panel 29. The cables 32 have one end thereof secured to the spindle 20 with the opposite ends thereof secured to coil springs 33 extending upwardly from the side wall 13 to which the panel 29 is secured. The cables 32 with the springs 33 maintain the front and rear edges of the panel 29 in tight engagement with the upper edges of the front and rear walls 15, 14, respectively.

A cable 34 is wound on the spool 26 having one end extending downwardly therefrom trained over pulleys 35, 36 mounted on the truck body 12. A cable 37 is wound on the spool 27 and has one end thereof extending downwardly therethrough and trained over pulleys 38, 39 mounted on the truck body 12. The cables 34, 37 have their free ends 40, 41 respectively, secured to opposite ends of a coil spring 42 resiliently securing the cables 34, 37 together. A guide tube 43 mounted in horizontal relation on the body 12 encompasses the coil spring 42, holding it in position.

In the use and operation of the invention, the spindle 20 with the panel 29 rolled thereon is supported on the brackets 18 on one side of the body 12. In this position the truck body 12 is open for loading or unloading, and to cover the truck 11 with the tarpaulin panel 29 the hand crank 28 is turned so that the spools 26, 27 wind the cables 34, 37 as the tarpaulin panel 29 is unwound from the spindle 20. The spring 42 is effective to maintain tension on the spindle 20 so that the tarpaulin 29 is retained in taut position on top of the body 12. On reaching the far side of the body 12, the spindle 20 is received in and supported by the brackets 18 with the cables 34, 37 maintaining pressure to retain the spindle 20 therein. When the tarpaulin panel 29 is rolled over the box, during such process the long spring 42 on one side and the two short springs 33 on the opposite side of the box are in operation at all times maintaining a constant tension on the front and back side of the tarpaulin panel so that it rolls evenly over the box with no folds or wrinkles. When the rolling handle or spindle 20 is locked in the covered tarpaulin position, by any desired means, as by means of wire holders, the same amount of tension is on all wires involved. Upon releasing the rolling handle 20 and uncovering the box, tension on the main spring 42 is released, which results in the two short springs 33 taking the tension released by the main spring 42. When the tarpaulin panel is in the uncovered position it drops into the rests provided by the arcuate brackets 18 and is held in that position by means of the spring tension. To uncover the body 12 the hand crank 28 is turned in the opposite direction until the tarpaulin panel 29 is completely wound on the spindle 20.

It will be understood that the configuration of the tarpaulin is optional and that the invention is not confined to use for only a truck body, but is useful in any relation where a cover of the kind disclosed might be found useful.

Having thus described the preferred embodiment of the invention, it should be understood that numerous modifications and adaptations may be resorted to without departing from the scope of the appended claims.

What is claimed is:

1. In a body of the type having a bottom wall, spaced apart parallel upright side walls, a front wall and a rear wall, a flexible cover for said body comprising a flexible tarpaulin panel having one edge thereof secured to the upper edge of one of said side walls, a spindle secured to an opposite edge of said tarpaulin parallel to the edge secured to said side of said body, means engaging the front and rear edges of said tarpaulin securing said front and rear edges in engagement with the upper edges of said front and rear walls of said body, and resilient means on said body engaging said spindle for holding said spindle with said tarpaulin panel tightly stretched across said body, said resilient means including a pair of spools secured at opposite ends of said spindle, a cable wound on each of said spools, and resilient means securing the opposite ends of said cables together and to said body.

2. A tarpaulin or like cover attachment for an enclosure having oppositely disposed, upright walls, said attachment comprising in combination a flexible cover, a spindle on which said cover is adapted to be wound, cable spools respectively each on an opposite end of said spindle, flexible cables trained around said spools, each of said cables connected with opposite ends of a spring tension means, means connecting said spring tension means to one of said upright walls and flexible cables each secured at one of their ends to said spindle, stitched through said cover and at their opposite ends secured to a spring tension means mounted on one of said upright walls.

References Cited in the file of this patent

UNITED STATES PATENTS

| 473,292 | Campbell | Apr. 19, 1892 |
| 481,954 | Jewel | Sept. 6, 1892 |
| 1,318,820 | Watkins | Oct. 14, 1919 |
| 2,562,300 | Dingman | July 31, 1951 |

FOREIGN PATENTS

| 64,559 | France | Nov. 14, 1955 |
| | (1st addition to 1,073,614) | |